(12) United States Patent
Kim (10) Patent No.: US 9,115,637 B2
(45) Date of Patent: Aug. 25, 2015

(54) RADIATOR FOR VEHICLE

(75) Inventor: Jae Yeon Kim, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 374 days.

(21) Appl. No.: 13/526,183

(22) Filed: Jun. 18, 2012

(65) Prior Publication Data
US 2013/0146260 A1    Jun. 13, 2013

(30) Foreign Application Priority Data
Dec. 7, 2011    (KR) .......................... 10-2011-0130515

(51) Int. Cl.
F01P 11/02 (2006.01)
B01D 19/00 (2006.01)
F28D 1/053 (2006.01)

(52) U.S. Cl.
CPC ........... *F01P 11/028* (2013.01); *B01D 19/0042* (2013.01); *F28D 1/05316* (2013.01); *F28F 2265/18* (2013.01); *Y10T 137/3084* (2015.04)

(58) Field of Classification Search
CPC ... F01P 11/028; F01P 11/029; B01D 19/0057
USPC ........ 165/104.32; 95/261; 96/216; 123/41.54
See application file for complete search history.

(56) References Cited

U.S. PATENT DOCUMENTS

| | | | | |
|---|---|---|---|---|
| 2,200,620 | A * | 5/1940 | Findley | 237/12.3 B |
| 2,231,501 | A * | 2/1941 | Jepertinger | 237/12.3 B |
| 3,028,716 | A * | 4/1962 | Sanderson et al. | 96/208 |
| 3,800,946 | A * | 4/1974 | Reid et al. | 210/788 |
| 4,075,984 | A * | 2/1978 | Kirchgessner et al. | 123/41.54 |
| 4,199,332 | A * | 4/1980 | Krohn et al. | 96/208 |
| 4,201,555 | A * | 5/1980 | Tkach | 95/15 |
| 4,247,309 | A * | 1/1981 | Buddenhagen | 95/261 |
| 4,548,622 | A * | 10/1985 | Suzuki et al. | 96/209 |
| 4,776,390 | A * | 10/1988 | Crofts | 165/104.32 |
| 5,257,661 | A * | 11/1993 | Frech et al. | 165/104.32 |
| 6,517,732 | B1 * | 2/2003 | Brockoff et al. | 210/782 |
| 7,878,231 | B2 * | 2/2011 | Akiyama et al. | 165/41 |

FOREIGN PATENT DOCUMENTS

| | | |
|---|---|---|
| JP | 11-14283 A | 1/1999 |
| JP | 2006-336556 A | 12/2006 |
| KR | 1998-044176 A | 9/1998 |
| KR | 10-0534895 B1 | 12/2005 |
| KR | 10-2010-0009821 A | 1/2010 |

* cited by examiner

*Primary Examiner* — Allen Flanigan
(74) *Attorney, Agent, or Firm* — Morgan, Lewis & Bockius LLP (57) ABSTRACT

A radiator apparatus for a vehicle may include an inlet tank receiving coolant from an engine, a heat-exchanging portion fluidly connected to the inlet tank and provided with a plurality of tubes and radiation fins so as to cool the coolant flowing in the tubes by exchanging heat with air, and an outlet tank disposed apart from the inlet tank and fluid-connected to the heat-exchanging portion, wherein the outlet tank receives the coolant from the heat-exchanging portion and discharges the coolant back to the engine, a bubble separating unit mounted on a connecting hose supplying the coolant from the engine to the inlet tank, wherein the bubble separating unit separates bubble contained in the coolant and supplies the coolant from which the bubble may be separated to the inlet tank so as for the coolant to pass through the heat-exchanging portion.

7 Claims, 7 Drawing Sheets

RADIATOR FOR VEHICLE

CROSS-REFERENCE TO RELATED APPLICATION

The present application claims priority to Korean Patent Application No. 10-2011-0130515 filed in the Korean Intellectual Property Office on Dec. 7, 2011, the entire contents of which is incorporated herein for all purposes by this reference.

BACKGROUND OF THE INVENTION

1. Field of the Invention

The present invention relates to a radiator for a vehicle. More particularly, the present invention relates to a radiator for a vehicle that improves cooling efficiency of coolant by receiving the coolant therein after bubble contained in the coolant exhausted from an engine is separated from the coolant.

2. Description of Related Art

Generally, mixture of fuel and air is injected into a cylinder of an engine and explosive force produced when the mixture is burnt is delivered to a driving wheel in a vehicle. Thereby, the vehicle runs. The engine is provided with a cooling apparatus such as a water jacket for cooling the engine of high temperature due to combustion of the mixture, and coolant, a temperature of which is raised when circulating through the water jacket is cooled by a radiator.

The radiator is divided into an air cooled radiator and a water cooled radiator according to cooling type, and is divided into a cross-flow radiator and a down-flow radiator according to flow direction of the coolant.

The air cooled radiator is a radiator in which the coolant is cooled by air and is universally used for a small engine. The water cooled radiator is a radiator in which the coolant is cooled by additional coolant and is used for a big engine.

The cross-flow radiator and the down-flow radiator are determined according to the flow direction of the coolant.

According to a conventional radiator, an inlet tank into which the coolant flows and an outlet tank from which the coolant is exhausted are disposed apart from each other, and a plurality of tubes is mounted between the inlet tank and the outlet tank so as to fluidly connect the inlet tank and the outlet tank. The coolant flows in the plurality of tubes and is cooled by exchanging heat with air.

Herein, the cross-flow radiator is a radiator where the inlet tank and the outlet tank are disposed at the left and the right and the tubes are mounted horizontally. Therefore, the coolant flows horizontally and is cooled in the cross-flow radiator.

In addition, the down-flow radiator is a radiator where the inlet tank and the outlet tank are disposed at the upside and the downside and the tubes are mounted vertically. Therefore, the coolant flows vertically and is cooled in the down-flow radiator.

The radiator is disposed in an engine compartment of the vehicle facing toward the front such that the coolant exchanges heat with cool air when the vehicle runs.

In a case that bubble is contained in the coolant exhausted after cooling the engine, however, the coolant including the bubble having lower coefficient of heat transfer flows according to a conventional radiator. The bubble takes a predetermined volume in a circulating line of the coolant and deteriorates heat exchanging performance. Therefore, cooling efficiency of the radiator may be deteriorated.

In a case that cooling efficiency of the radiator is deteriorated, the coolant is supplied to the engine in a state of not being cooled to a demand temperature. Therefore, the engine may not be cooled preferably and cooling performance of the vehicle may be deteriorated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a radiator for a vehicle having advantages of reducing flow resistance of coolant and improving cooling efficiency by receiving the coolant after bubble contained in the coolant exhausted from an engine is separated from the coolant.

In addition, various aspects of the present invention are directed to providing a radiator for a vehicle having further advantages of improving cooling performance of the engine without increasing capacity of the radiator, reducing a size of the radiator, lowering manufacturing cost, and improving utilization of space in an engine compartment by improving cooling efficiency of the coolant so as to cool the coolant to a demand temperature.

In an aspect of the present invention, a radiator apparatus for a vehicle, may include an inlet tank receiving coolant from an engine, a heat-exchanging portion fluidly connected to the inlet tank and provided with a plurality of tubes and radiation fins so as to cool the coolant flowing in the tubes by exchanging heat with air, and an outlet tank disposed apart from the inlet tank and fluid-connected to the heat-exchanging portion, wherein the outlet tank receives the coolant from the heat-exchanging portion and discharges the coolant back to the engine, a bubble separating unit mounted on a connecting hose supplying the coolant from the engine to the inlet tank, wherein the bubble separating unit separates bubble contained in the coolant and supplies the coolant from which the bubble is separated to the inlet tank so as for the coolant to pass through the heat-exchanging portion.

The bubble separating unit may include an inflow port integrally formed at a side of an upper portion of the inlet tank and fluidly connected to the engine through the connecting hose so as to receive the coolant from the engine, a bubble generating portion formed at the inflow port and rotating the coolant to generate a whirlpool so as to separate the bubble from the coolant when the coolant flows into the inflow port, a filler neck protruded from an upper end of the inlet tank and provided with a bubble gathering portion formed in the filler neck, the bubble separated from the coolant by the bubble generating portion being gathered in the bubble gathering portion, wherein the bubble gathering portion is disposed higher than the inflow port, and a bubble exhaust port formed at a side of the bubble gathering portion and exhausting the gathered bubble therethrough.

The bubble exhaust port is fluid-connected to a reserve tank to exhaust the bubble.

An inner cross section of the inflow port is smaller than an inner cross section of the inlet tank.

The bubble generating portion is a spiral groove formed at an interior circumference of the inflow port with a spiral shape along a longitudinal direction of the inflow port.

The bubble generating portion may include an inserting body inserted in the inflow port and engaged to an interior circumference of the inflow port, and a spiral groove formed at an interior circumference of the inserting body along a longitudinal direction of the inserting body.

An inner cross section of the inserting body is smaller than an inner cross section of the inlet tank.

The radiator may further include a cap mounted at an upper end of the bubble gathering portion wherein the coolant is replenished through the bubble gathering portion after the cap is open.

The bubble separating unit may include a filler neck body provided with an inflow port fluidly connected to the engine through the connecting hose at a side surface thereof and an exhaust port fluidly connected to an inlet hole formed at the inlet tank at another side surface thereof, a bubble generating portion formed at an interior circumference of the inflow port and rotating the coolant to generate a whirlpool so as to separate the bubble from the coolant when the coolant flows into the inflow port, a bubble gathering portion integrally protruded upwards from an upper end of the filler neck body and disposed higher than the inflow port to gather therein the bubble separated from the coolant by the bubble generating portion, and a bubble exhaust port formed at a side of an upper portion of the bubble gathering portion so as to exhaust the bubble gathered in the bubble gathering portion.

The bubble exhaust port is fluid-connected to a reserve tank to exhaust the bubble.

An inner cross section of the inflow port is smaller than an inner cross section of the filler neck body.

The bubble generating portion is a spiral groove formed at an interior circumference of the inflow port with a spiral shape along a longitudinal direction of the inflow port.

The inflow port is disposed higher than that of the exhaust port.

The exhaust port is formed at another side surface neighboring the side surface where the inflow port is formed.

The radiator apparatus may further include a cap mounted at an upper end of the bubble gathering portion, wherein the coolant is replenished through the bubble gathering portion after the cap is open.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will he understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Exemplary embodiments described in this specification and drawings are just exemplary embodiments of the present invention. It is to be understood that there can be various modifications and equivalents included in the spirit of the present invention at the filing of this application.

Figure 1:
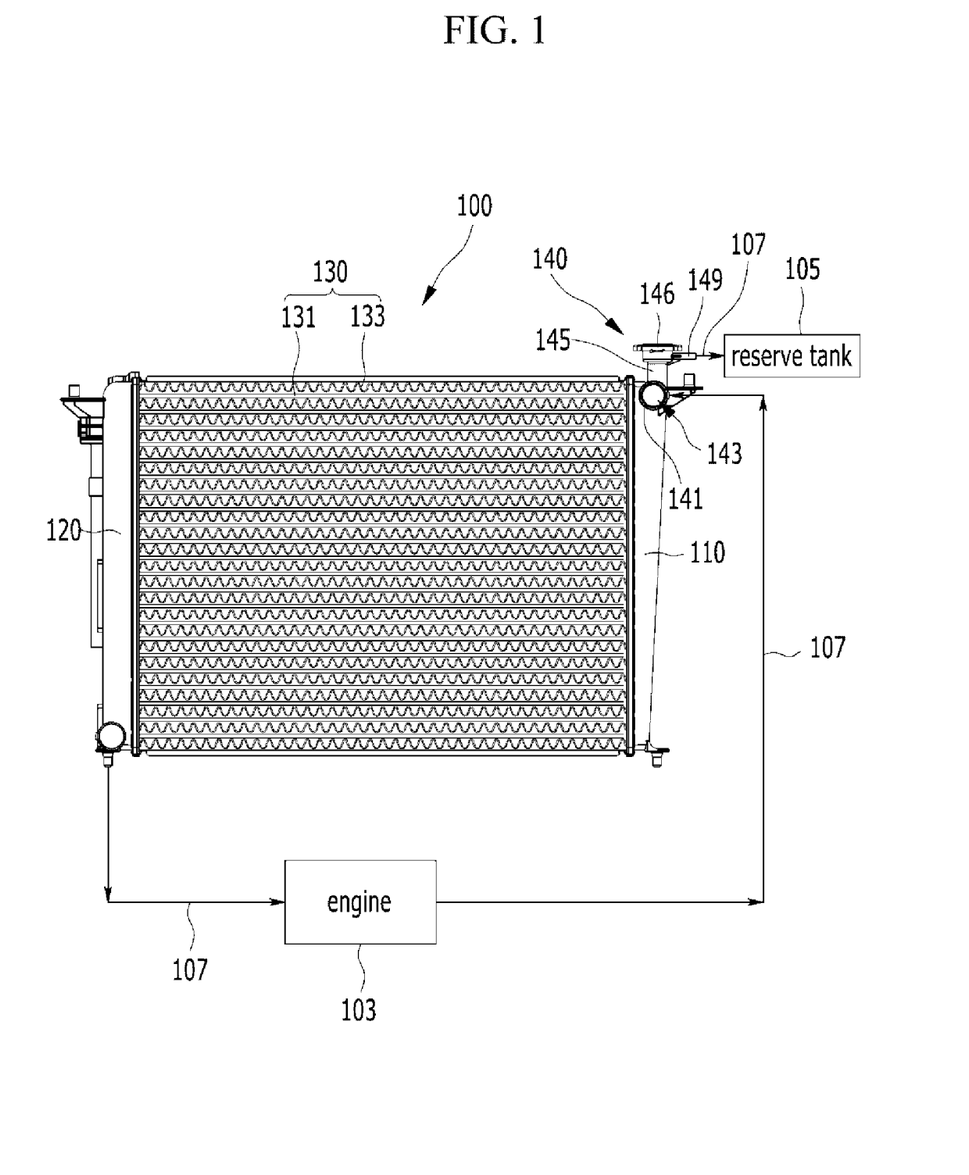
FIG. 1 is a front view of a radiator for a vehicle according to the various exemplary embodiments of the present invention.
Figure 2:
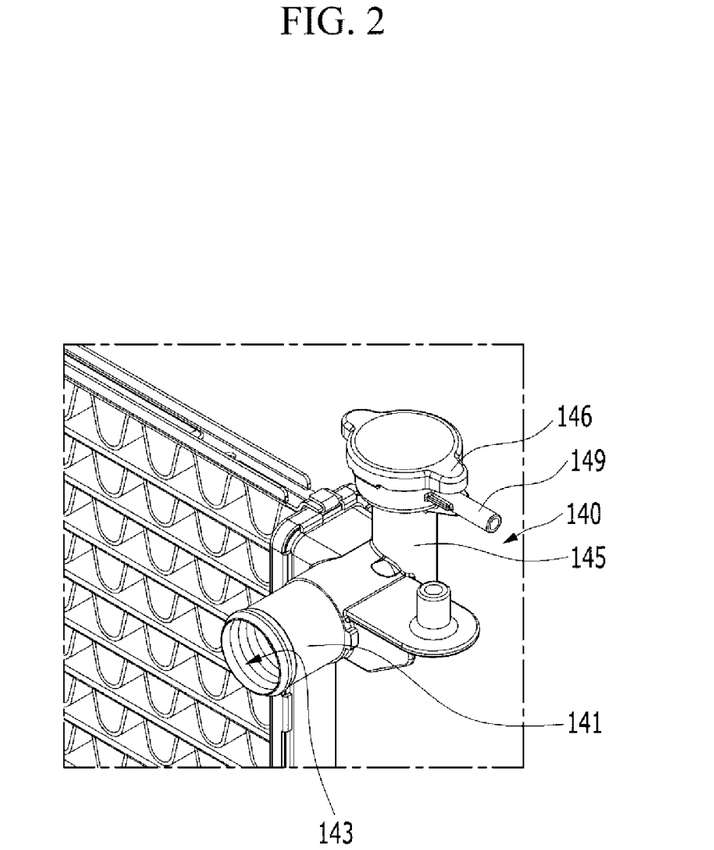
FIG. 2 is a partial enlarged perspective view of FIG. 1.

FIG. 1 is a front view of a radiator for a vehicle according to the first exemplary embodiment of the present invention, and FIG. 2 is a partial enlarged perspective view of FIG. 1.

A radiator for a vehicle according to exemplary embodiments of the present invention is adapted to reduce flow resistance of coolant and improve cooling efficiency by receiving the coolant therein after bubble contained in the coolant exhausted from an engine is separated from the coolant.

In addition, the radiator for the vehicle according to exemplary embodiments of the present invention is adapted to improve cooling performance of the engine without increasing capacity of the radiator, reduce a size of the radiator, lower manufacturing cost, and improve utilization of space in an engine compartment by improving cooling efficiency of the coolant so as to cool the coolant to a demand temperature.

For these purposes, the radiator 100 for the vehicle according to the first exemplary embodiment of the present invention, as shown in FIG. 1, includes an inlet tank 110 into which the coolant flows and an outlet tank 120 from which the coolant is exhausted, and the inlet tank 110 and the outlet tank 120 are disposed apart from each other.

In addition, a heat-exchanging portion 130 is disposed between the inlet tank 110 and the outlet tank 120. The heat-exchanging portion 130 includes a plurality of tubes 131 and radiation fins 133, and the coolant flowing through the tubes 131 exchanges heat with air. The heat-exchanging portion 130 connects inner sides of the inlet tank 110 and the outlet tank 120.

The coolant flowing into the inlet tank 110 is adapted to pass through the heat-exchanging portion 130 after the bubble is separated from the coolant in the radiator 100 according to the present exemplary embodiment. For this purpose, the radiator 100 is connected to the inlet tank 110 and further includes a bubble separating unit 140 for separating the bubble from the coolant exhausted from the engine 103.

In the present exemplary embodiment, the bubble separating unit 140, as shown in FIG. 2, includes an inflow port 141, a bubble generating portion 143, a filler neck 145, and a bubble exhaust port 149, and each constituent element will be described in detail.

The inflow port 141 is integrally formed with at a side of an upper portion of the inlet tank 110 and is connected to the engine 103 through a connecting hose 107 such that the coolant exhausted from the engine 103 flows into the inlet tank 110.

In the present exemplary embodiment, the bubble generating portion 143 is formed at the inflow port 141. When the coolant flows into the inflow port 141, the bubble generating portion 143 causes the coolant to rotate and generate a whirlpool so as to separate the bubble from the coolant.

Herein, the bubble generating portion 143 may be a spiral groove formed at an interior circumference of the inflow port 141 with a spiral shape.

That is, the coolant flows along the spiral groove formed with the spiral shape and is rotated when the coolant flows in the bubble generating portion 143.

If the coolant rotates along the interior circumference of the bubble generating portion 143, the whirlpool is generated at a center portion of the bubble generating portion 143 in a length direction by centrifugal force. At this time, the bubble is gathered to a center of the whirlpool and is separated from the coolant.

In the present exemplary embodiment, the filler neck 145 is protruded from an upper end of the inlet tank 110. A cap 146 is mounted at an upper portion of the filler neck 145, and a bubble gathering portion 147 for gathering the bubble separated from the coolant by the bubble generating portion 143 is formed in the filler neck 145.

That is, since the bubble separated from the coolant during passing through the bubble generating portion 143 is lighter than the coolant, the bubble moves to and is gathered in the bubble gathering portion 147 positioned higher than the bubble generating portion 143.

Meanwhile, the coolant may be replenished through the bubble gathering portion 147 after the cap 146 mounted at the upper end of the bubble gathering portion 147 is open.

In addition, the bubble exhaust port 149 is formed at a side of an upper portion of the filler neck 145 and is connected to a reserve tank 105 so as to exhaust the gathered bubble.

Hereinafter, operation of the radiator 100 for the vehicle according to the first exemplary embodiment of the present invention will be described in detail.

Figure 3:
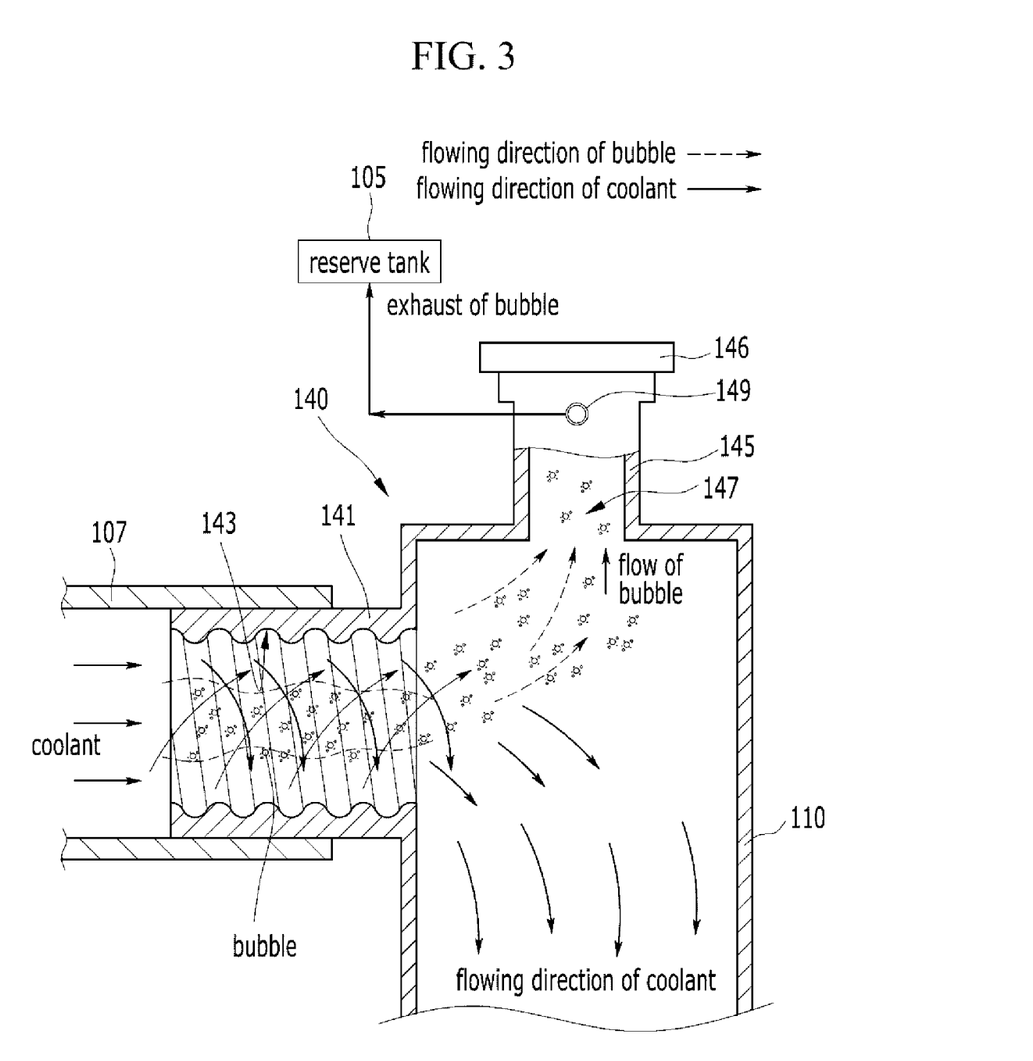
FIG. 3 is a cross-sectional view of a bubble separating unit for showing operation of a radiator for a vehicle according to the various exemplary embodiments of the present invention.

FIG. 3 is a cross-sectional view of a bubble separating unit for showing operation of a radiator for a vehicle according to the first exemplary embodiment of the present invention.

Referring to the drawing, the coolant cooling the engine 103 flows into the inflow port 141 of the inlet tank 110 through the connecting hose 107 in the radiator 100 for the vehicle according to the first exemplary embodiment of the present invention.

Then, the coolant is rotated by the bubble generating portion 143 of the inflow port 141 formed with the spiral groove and flows into the inlet tank 110.

When the coolant is rotated along the interior circumference of the bubble generating portion 143, the whirlpool is generated at the center portion of the bubble generating portion 143 in the length direction by centrifugal force. At this time, the bubble moves to the center of the whirlpool and is separated from the coolant.

If the coolant passes through the inflow port 141 and flows into the inlet tank 110, centrifugal force becomes weak in the inlet tank 110 having a larger cross-sectional area than the inflow port 141 does and rotation of the coolant is stopped.

At this time, since the bubble separated from the coolant is lighter than the coolant, the bubble moves to and is gathered in the bubble gathering portion 147 of the filler neck 145 formed at the upper portion of the inlet tank 110.

In addition, the bubble gathered in the bubble gathering portion 147 is exhausted to the reserve tank 105 through the bubble exhaust port 149, and the coolant from which the bubble is separated flows from the inlet tank 110 to the heat-exchanging portion 130 and exchanges heat with the air during passing through the heat-exchanging portion 130.

The cooled coolant is exhausted through the outlet tank 120 and is supplied to the engine 103 so as to cool the engine.

Figure 4:
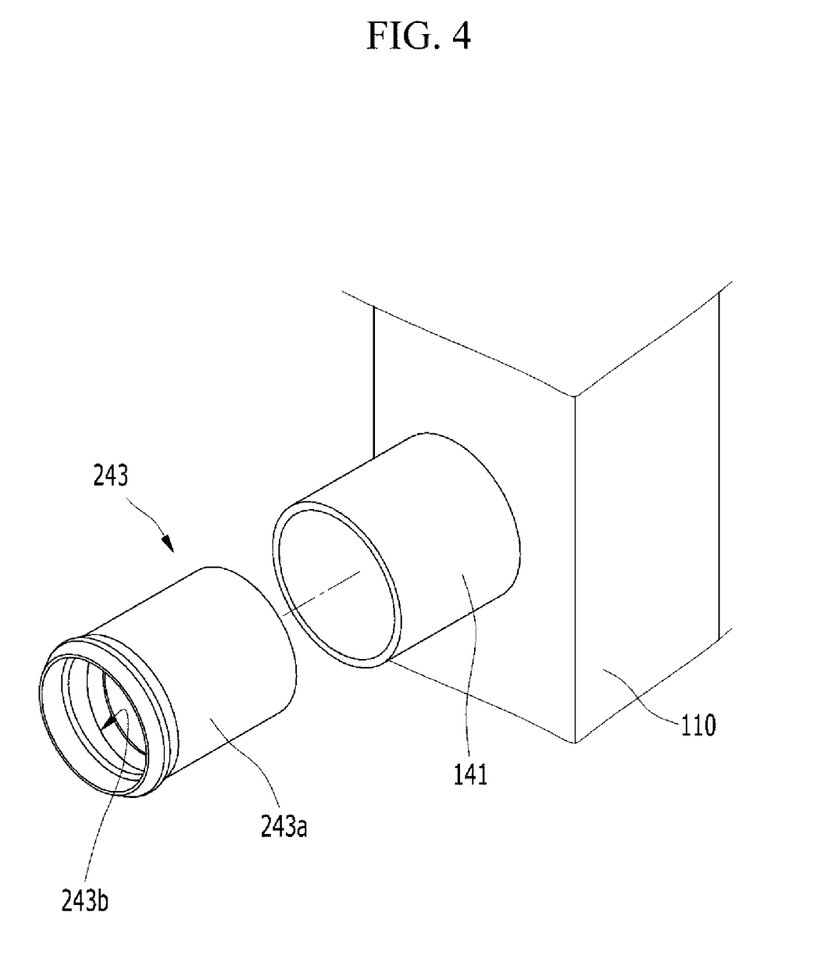
FIG. 4 is a perspective view of a bubble generating portion applied to a radiator for a vehicle according to the various exemplary embodiments of the present invention.

FIG. 4 is a perspective view of a bubble generating portion applied to a radiator for a vehicle according to the second exemplary embodiment of the present invention.

The radiator 100 according to the second exemplary embodiment of the present invention is the same as that according to the first exemplary embodiment of the present invention except a structure of the bubble generating portion 243.

The bubble generating portion 243 according to the second exemplary embodiment of the present invention, as shown in FIG. 4, includes an inserting body 243a and a spiral groove 243b.

The inserting body 243a is inserted in the inflow port 141 and is fixed to the interior circumference of the inflow port 141.

The inserting body 243a is formed with a pipe of a cylindrical shape having a predetermined thickness.

In addition, the spiral groove 243b has the spiral shape and is integrally formed at an interior circumference of the inserting body 243a in a length direction.

That is, the bubble generating portion 243 according to the second exemplary embodiment of the present invention, different from the first exemplary embodiment, is separately formed from the inflow port 141. The bubble generating portion 243 is inserted in and fixed to the inflow port 141 of the inlet tank 110. Operation of the bubble generating portion 243 according to the second exemplary embodiment of the present invention is the same as that of the bubble generating portion 143 according to the first exemplary embodiment. Therefore, detailed description will be omitted.

Figure 5:
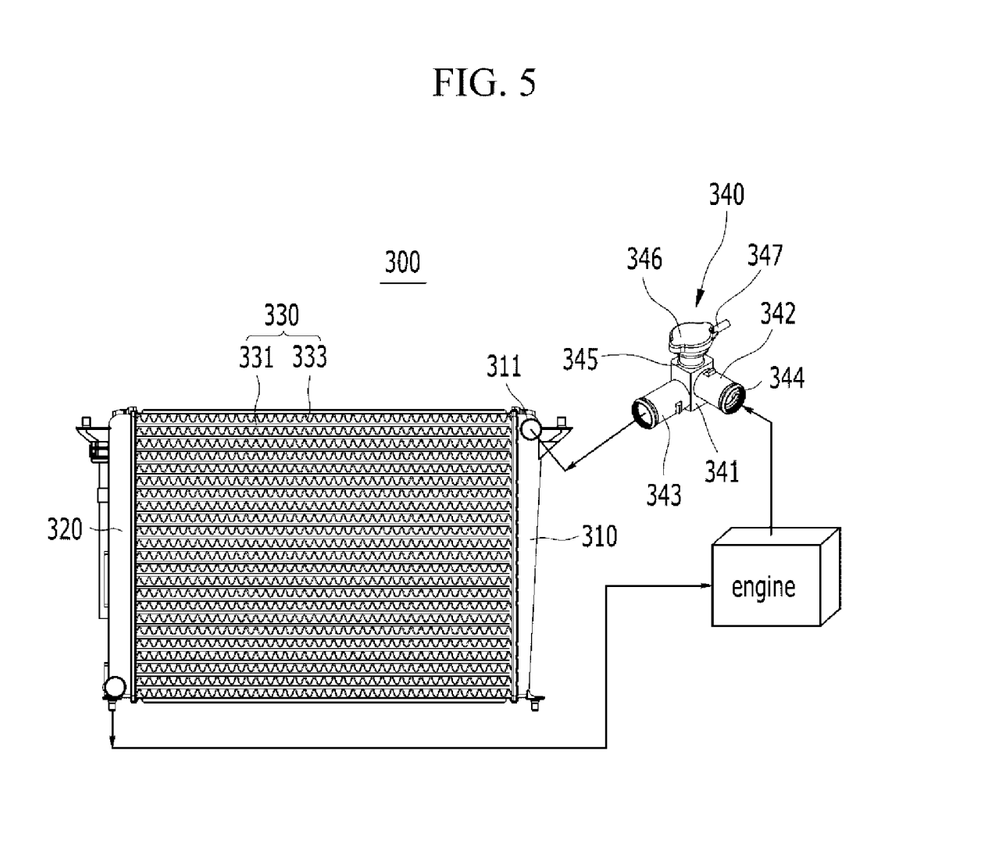
FIG. 5 is a schematic diagram of a radiator for a vehicle according to the various exemplary embodiments of the present invention.
Figure 6:
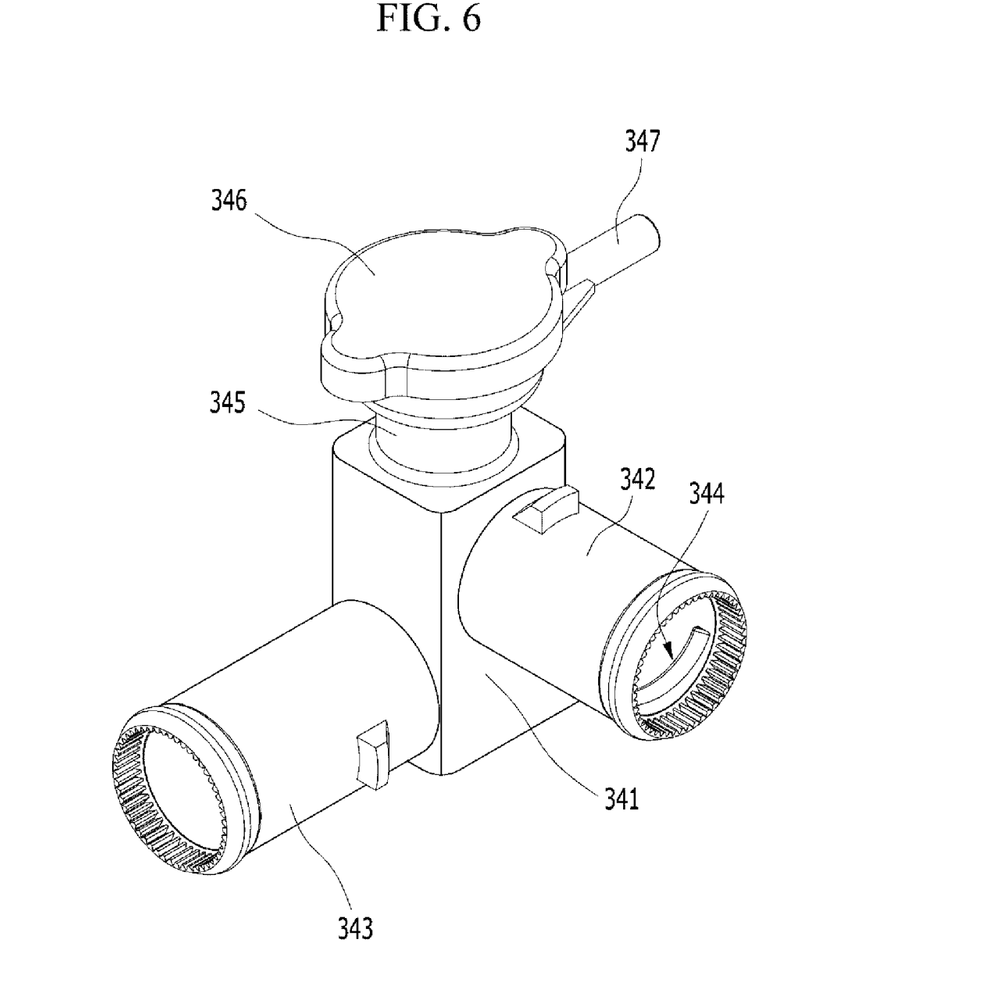
FIG. 6 is a perspective view of a bubble separating unit applied to a radiator for a vehicle according to the various exemplary embodiments of the present invention.

FIG. 5 is a schematic diagram of a radiator for a vehicle according to the third exemplary embodiment of the present invention, and FIG. 6 is a perspective view of a bubble separating unit applied to a radiator for a vehicle according to the third exemplary embodiment of the present invention.

Referring to the drawings, a radiator 300 for the vehicle according to the third exemplary embodiment of the present invention, as shown in FIG. 5, includes the inlet tank 310 into which the coolant flows and the outlet tank 320 from which the coolant is exhausted, and the inlet tank 310 and the outlet tank 320 are disposed apart from each other.

In addition, the heat-exchanging portion 330 is disposed between the inlet tank 310 and the outlet tank 320. The heat-exchanging portion 330 includes the plurality of tubes 331 and radiation fins 333, and the coolant flowing through the tubes 331 exchanges heat with the air. The heat-exchanging portion 330 connects the inner sides of the inlet tank 310 and the outlet tank 320.

The coolant flowing into the inlet tank 310 is adapted to pass through the heat-exchanging portion 330 after the bubble is separated from the coolant in the radiator 300 according to the third exemplary embodiment of the present invention. For this purpose, the radiator 300 is connected to the inlet tank 310 and further includes the bubble separating unit 340 for separating the bubble from the coolant exhausted from the engine 103.

In the third exemplary embodiment of the present invention, the bubble separating unit 340, as shown in FIG. 6, includes a filler neck body 341, the bubble generating portion 344, the bubble gathering portion 345, and the bubble exhaust port 347, and each constituent element will be described in detail.

The filler neck body 341 is provide with the inflow port 342 formed at a side surface thereof and connected to the engine 103 through the connecting hose 107, and an exhaust port 343 formed at another side surface thereof and connected to an inlet hole 311 formed at the side of the upper portion of the inlet tank 310.

Herein, the inflow port 342 and the exhaust port 343 are formed respectively at an upper portion and a lower portion of the filler neck body 341. Therefore, a mounting position of the inflow port 342 is higher than that of the exhaust port 343.

In addition, the exhaust port 343 is formed at another side surface neighboring the side surface where the inflow port 342 is formed.

In addition, the bubble generating portion 344 is formed at the interior circumference of the inflow port 342. When the coolant flows into the inflow port 342, the bubble generating portion 344 causes the coolant to rotate and generate the whirlpool so as to separate the bubble from the coolant.

The bubble generating portion 344 may be the spiral groove formed at the interior circumference of the inflow port with the spiral shape.

That is, the coolant flows along the spiral groove formed with the spiral shape and is rotated when the coolant flows in the bubble generating portion 344.

If the coolant rotates along the interior circumference of the bubble generating portion 344, the whirlpool is generated at the center portion of the bubble generating portion 344 in the length direction by centrifugal force. At this time, the bubble is gathered to a center of the whirlpool and is separated from the coolant.

Herein, the coolant from which the bubble is separated flows to the exhaust port 343 formed at the lower portion of the inflow port 342 through the filler neck body 341. Since the cross-sectional area of the filler neck body 341 is bigger than that of the inflow port 342, centrifugal force becomes weak and rotation of the coolant is stopped.

In the third exemplary embodiment of the present invention, the bubble gathering portion 345 is integrally protruded from an upper end of the filler neck body 342 and the cap 346 is mounted at the upper end of the bubble gathering portion 345. The bubble separated by the bubble generating portion 344 is gathered in the bubble gathering portion 345.

That is, centrifugal force of the coolant from which the bubble is separated becomes weak in the filler neck body 341, and the coolant is exhausted through the exhaust port 343 formed below of the inflow port 342. In addition, since the bubble separated from the coolant is lighter than the coolant, the bubble moves upward in the filler neck body 341 and is gathered in the bubble generating portion 344.

Meanwhile, the coolant may be replenished through the bubble gathering portion 345 after the cap 346 mounted at the upper end of the bubble gathering portion 345 is open.

In addition, the bubble exhaust port 347 is formed at a side of the upper portion of the bubble gathering portion 345 and is connected to a reserve tank 105 so as to exhaust the bubble gathered in the bubble gathering portion 345.

Hereinafter, operation of the radiator 300 for the vehicle according to the third exemplary embodiment of the present invention will be described in detail.

Figure 7:
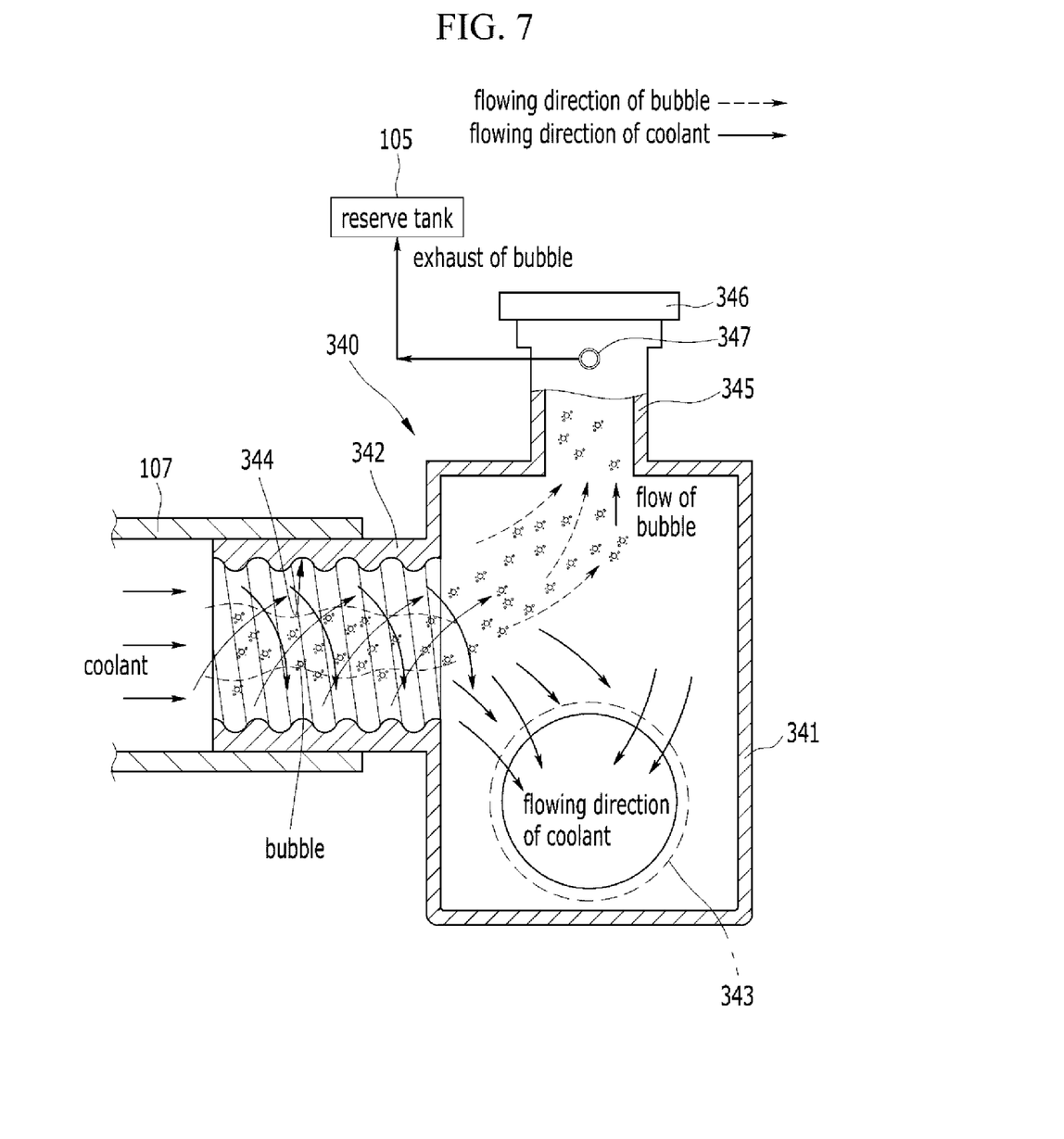
FIG. 7 is a cross-sectional view of a bubble separating unit for showing operation of the bubble separating unit according to the various exemplary embodiments of the present invention.

FIG. 7 is a cross-sectional view of a bubble separating unit for showing operation of the bubble separating unit according to the third exemplary embodiment of the present invention.

Referring to the drawing, the coolant cooling the engine 103 flows into the inflow port 342 of the filler neck body 341 through the connecting hose 107 in the radiator 300 for the vehicle according to the third exemplary embodiment of the present invention.

Then, the coolant is rotated by the bubble generating portion 344 of the inflow port 342 formed with the spiral groove and flows into the filler neck body 341.

When the coolant is rotated along the interior circumference of the bubble generating portion 344, the whirlpool is generated at the center portion of the bubble generating portion 344 in the length direction by centrifugal force. At this time, the bubble moves to the center of the whirlpool and is separated from the coolant.

If the coolant passes through the inflow port 342 and flows into the filler neck body 341, centrifugal force becomes weak in the filler neck body 341 having a larger cross-sectional area than the inflow port 342 does and rotation of the coolant is stopped. At this state, the coolant flows toward the exhaust port 343 and is exhausted from the filler neck body 341 through the exhaust port 343.

At this time, since the bubble separated from the coolant in the filler neck body 341 is lighter than the coolant, the bubble moves to and is gathered in the bubble gathering portion 345 formed at the upper portion of the filler neck body 341.

The bubble gathered in the bubble gathering portion 345 is exhausted to the reserve tank 105 through the bubble exhaust port 347.

In addition, the coolant from which the bubble is separated flows into the inlet hole 311 of the inlet tank 310 through the connecting hose 107. The coolant exchanges heat with the air and is cooled during passing through the heat-exchanging portion 330. After that, the coolant is supplied back to the engine and cools the engine 103.

If the radiator 100 and 300 for the vehicle according to exemplary embodiments of the present invention is used, the radiator 100 and 300 can receive the coolant after the bubble contained in the coolant exhausted from the engine 103 is separated from the coolant. Therefore, flow resistance of the coolant may be reduced and cooling efficiency may be improved.

Since the radiator 100 and 300 for the vehicle according to exemplary embodiments of the present invention can cools the coolant to the demand temperature by improving cooling efficiency of the coolant. Therefore, cooling performance of the engine may be improved without increasing capacity of the radiator, the size of the radiator may be reduced, manufacturing cost may be lowered, and utilization of space in an engine compartment may be improved.

Since the bubble contained in the coolant is separated and the separated bubble is exhausted to the reserve tank 105 according to the present exemplary embodiments, the bubble separated from the coolant is prevented from flowing into the radiator 100 and 300.

When explaining the radiator 100 for the vehicle and 300 according to the first, second, and third exemplary embodiments of the present invention, it is exemplified that the bubble generating portion 143, 243, and 344 of the bubble separating unit 140 and 340 is formed at the inflow port 141 and 342. The bubble generating portion 143, 243, and 344, however, cannot be formed at the inflow port 141 and 342.

The bubble generating portion formed with the spiral groove may be formed at an interior circumference of an end portion of the connecting hose 107 connected to the inflow port.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A radiator apparatus for a vehicle, comprising:
   an inlet tank receiving coolant from an engine;
   a heat-exchanging portion fluidly connected to the inlet tank and provided with a plurality of tubes and radiation fins so as to cool the coolant flowing in the tubes by exchanging heat with air; and
   an outlet tank disposed apart from the inlet tank and fluid-connected to the heat-exchanging portion, wherein the outlet tank receives the coolant from the heat-exchanging portion and discharges the coolant back to the engine;
   a bubble separating unit mounted on a connecting hose supplying the coolant from the engine to the inlet tank, wherein the bubble separating unit separates the bubble contained in the coolant and supplies the coolant from which the bubble is separated to the inlet tank so as for the coolant to pass through the heat-exchanging portion,
   wherein the bubble separating unit includes:
   a filler neck body provided with an inflow port fluidly connected to the engine through the connecting hose at a side surface thereof and an exhaust port fluidly connected to an inlet hole formed at the inlet tank at another side surface thereof;
   a bubble separating portion formed at an interior circumference of the inflow port and rotating the coolant to generate a whirlpool so as to separate the bubble from the coolant when the coolant flows into the inflow port;
   a bubble gathering portion integrally protruded upwards from an upper end of the filler neck body and disposed higher than the inflow port to gather therein the bubble separated from the coolant by the bubble separating portion; and
   a bubble exhaust port formed at a side of an upper portion of the bubble gathering portion so as to exhaust the bubble gathered in the bubble gathering portion.

2. The radiator apparatus of claim 1, wherein the bubble exhaust port is fluid-connected to a reserve tank to exhaust the bubble.

3. The radiator apparatus of claim 1, wherein an inner cross section of the inflow port is smaller than an inner cross section of the filler neck body.

4. The radiator apparatus of claim 1, wherein the bubble separating portion is a spiral groove formed at an interior circumference of the inflow port with a spiral shape along a longitudinal direction of the inflow port.

5. The radiator apparatus of claim 1, wherein the inflow port is disposed higher than that of the exhaust port.

6. The radiator apparatus of claim 1, wherein the exhaust port is formed at another side surface neighboring the side surface where the inflow port is formed.

7. The radiator apparatus of claim 1, further including a cap mounted at an upper end of the bubble gathering portion,
   wherein the coolant is replenished through the bubble gathering portion after the cap is open.

\* \* \* \* \*